US012332221B2

(12) United States Patent
Owa

(10) Patent No.: US 12,332,221 B2
(45) Date of Patent: Jun. 17, 2025

(54) SUPERCRITICAL FLUID APPARATUS AND PRESSURE CONTROL METHOD USED IN SUPERCRITICAL FLUID APPARATUS

(71) Applicant: SHIMADZU CORPORATION, Kyoto (JP)

(72) Inventor: Michiaki Owa, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 459 days.

(21) Appl. No.: 17/616,657

(22) PCT Filed: Jun. 11, 2019

(86) PCT No.: PCT/JP2019/023153
§ 371 (c)(1),
(2) Date: Dec. 5, 2021

(87) PCT Pub. No.: WO2020/250314
PCT Pub. Date: Dec. 17, 2020

(65) Prior Publication Data
US 2022/0229023 A1    Jul. 21, 2022

(51) Int. Cl.
*G01N 30/28* (2006.01)
*B01D 15/40* (2006.01)
(Continued)

(52) U.S. Cl.
CPC ............ *G01N 30/28* (2013.01); *B01D 15/40* (2013.01); *G05D 16/20* (2013.01);
(Continued)

(58) Field of Classification Search
CPC .. G01N 30/28; G01N 30/32; G01N 2030/027; G01N 2030/285; B01D 15/40; G05D 16/20
(Continued)

(56) References Cited

U.S. PATENT DOCUMENTS 5,198,115 A * 3/1993 Stalling ................ G01N 30/467
210/634
2007/0264175 A1* 11/2007 Iversen ..................... B27K 7/00
422/235
(Continued)

FOREIGN PATENT DOCUMENTS

EP    0544988 A1 *  6/1993
EP    3395424 A1 * 10/2018 ............. B01D 15/40
(Continued)

OTHER PUBLICATIONS

Machine-generated English translation of WO 2015/029253, generated on Apr. 2, 2024.*
(Continued)

*Primary Examiner* — Fred Prince
(74) *Attorney, Agent, or Firm* — Renner, Otto, Boisselle & Sklar, LLP

(57) ABSTRACT

A supercritical fluid apparatus includes a solvent supplier that supplies a solvent, a pressure control device provided in a flow path for a solvent supplied by the solvent supplier, and a controller that controls the pressure control device. The controller includes a first controller that increases a pressure in the flow path, puts the solvent in a supercritical fluid state and maintains an environment for execution of a predetermined process by controlling the pressure control device, and a second controller that sets an intermediate target value for a pressure in the flow path and controls a pressure in the flow path in order to get the pressure to reach the intermediate target value, when ending the environment for execution of a predetermined process.

10 Claims, 3 Drawing Sheets

(51) Int. Cl.
  G01N 30/32 (2006.01)
  G05D 16/20 (2006.01)
  G01N 30/02 (2006.01)

(52) U.S. Cl.
  CPC . *G01N 2030/027* (2013.01); *G01N 2030/285* (2013.01); *G01N 30/32* (2013.01)

(58) Field of Classification Search
  USPC .................................. 210/198.2, 656, 659
  See application file for complete search history.

(56) References Cited

U.S. PATENT DOCUMENTS

| | | | |
|---|---|---|---|
| 2013/0015138 A1* | 1/2013 | Schlake | G01N 30/32 210/656 |
| 2016/0202218 A1 | 7/2016 | Owa | |

FOREIGN PATENT DOCUMENTS

| | | | |
|---|---|---|---|
| JP | 2004-265203 A | | 9/2004 |
| JP | 2005326180 A | * | 11/2005 |
| JP | 2007-111693 A1 | | 5/2007 |
| JP | 2016-130691 A | | 7/2016 |
| WO | 2015/029253 A1 | | 3/2015 |

OTHER PUBLICATIONS

Machine-generated English translation of JP 2004265203, generated on Apr. 2, 2024.*
Machine-generated English translation of JP 2005326180, generated on Jan. 8, 2025.*
International Search Report for corresponding Application No. PCT/JP2019/023153, mailed Aug. 27, 2019.
Written Opinion for corresponding Application No. PCT/JP2019/023153, mailed Aug. 27, 2019 (English machine translation).
Notice of Reasons for Refusal for corresponding Japanese Patent Application No. 2021-525450 dated Nov. 29, 2022, with English machine translation.
Decision of Refusal for corresponding Japanese Patent Application No. 2021-525450 dated May 23, 2023, with English machine translation.
Office Action in corresponding Chinese Patent Application No. 201980096903.5 dated Mar. 22, 2024, with English machine translation.
Notice of Reasons for Refusal in corresponding Japanese Patent Application No. 2023-131039 dated Jul. 30, 2024, with English machine translation.

* cited by examiner

SUPERCRITICAL FLUID APPARATUS AND PRESSURE CONTROL METHOD USED IN SUPERCRITICAL FLUID APPARATUS

TECHNICAL FIELD

The present invention relates to a supercritical fluid apparatus and a pressure control method performed in the supercritical fluid apparatus.

BACKGROUND ART

As a method of analyzing a sample, there is Supercritical Fluid Chromatography (SFC) with which a supercritical fluid is used as a mobile phase. A supercritical fluid has the properties of both liquid and gas and is characterized in having higher diffusibility and lower viscosity than liquid. It is possible to perform a sample analysis at a high speed and with high resolution and high sensitivity by using a supercritical fluid having such properties as a solvent. Further, as a method of extracting a sample, there is Supercritical Fluid Extraction (SFE) with which a supercritical fluid is used as an extraction medium.

In order to maintain a solvent in a supercritical state, a flow rate of solvent is set to an extremely-low flow rate which is equal to or lower than 3 ml/minute, and a pressure in a flow path is set equal to or larger than 10 MPa, for example. Therefore, in a supercritical fluid apparatus that performs supercritical fluid chromatography or supercritical fluid extraction, a pressure control device is provided to adjust a pressure in a flow path for a solvent.

The below-mentioned Patent Document 1 relates to the configuration of a pressure control valve provided in a supercritical fluid chromatograph. In the pressure control valve of Patent Document 1, a stepping motor and a piezo element are used as actuators for driving a valve element.

[Patent Document 1] WO 2015/029253 A1

SUMMARY OF INVENTION

Technical Problem

When an analysis process ends in the supercritical fluid chromatograph, the procedure for depressurizing a flow path is performed by control of a pressure control device. Then, the pressure in a separation column included in the supercritical fluid chromatograph also decreases from a high pressure equal to or larger than 10 MPa to about an atmospheric pressure. At this time, due to a rapid decrease in pressure, a stationary phase in the separation column may be uneven or a path caused by a mobile phase may be generated in a stationary phase. In a case where uniformity of the stationary phase in the separation column is degraded in this manner, this may cause deterioration of separation performance in a next analysis process. Further, in a case where uniformity of the stationary phase in the separation column is degraded, it may shorten the lifetime of the separation column.

A device that performs supercritical fluid extraction may extract unnecessary components from an extraction container and collects a residue in the extraction container as a target sample. In case of such an extraction process, a sample in the extraction container is disturbed due to a rapid change in pressure in a flow path.

An object of the present invention is to suppress a rapid change in pressure in a flow path in a supercritical fluid apparatus.

Solution to Problem

A supercritical fluid apparatus according to one aspect of the present invention includes a solvent supplier that supplies a solvent, a pressure control device provided in a flow path for a solvent supplied by the solvent supplier, and a controller that controls the pressure control device. The controller includes a first controller that increases a pressure in the flow path, puts the solvent in a supercritical fluid state and maintains an environment for execution of a predetermined process by controlling the pressure control device, and a second controller that sets an intermediate target value for a pressure in the flow path and controls a pressure in the flow path in order to get the pressure to reach the intermediate target value, when ending the environment for execution of a predetermined process.

Advantageous Effects of Invention

The present invention enables suppression of a rapid change in pressure in a flow path in a supercritical fluid apparatus.

DESCRIPTION OF EMBODIMENTS

The configuration of a supercritical fluid chromatograph according to embodiments of the present invention will now be described with reference to the attached drawings.

(1) Overall Configuration of Supercritical Fluid Chromatograph

Figure 1:
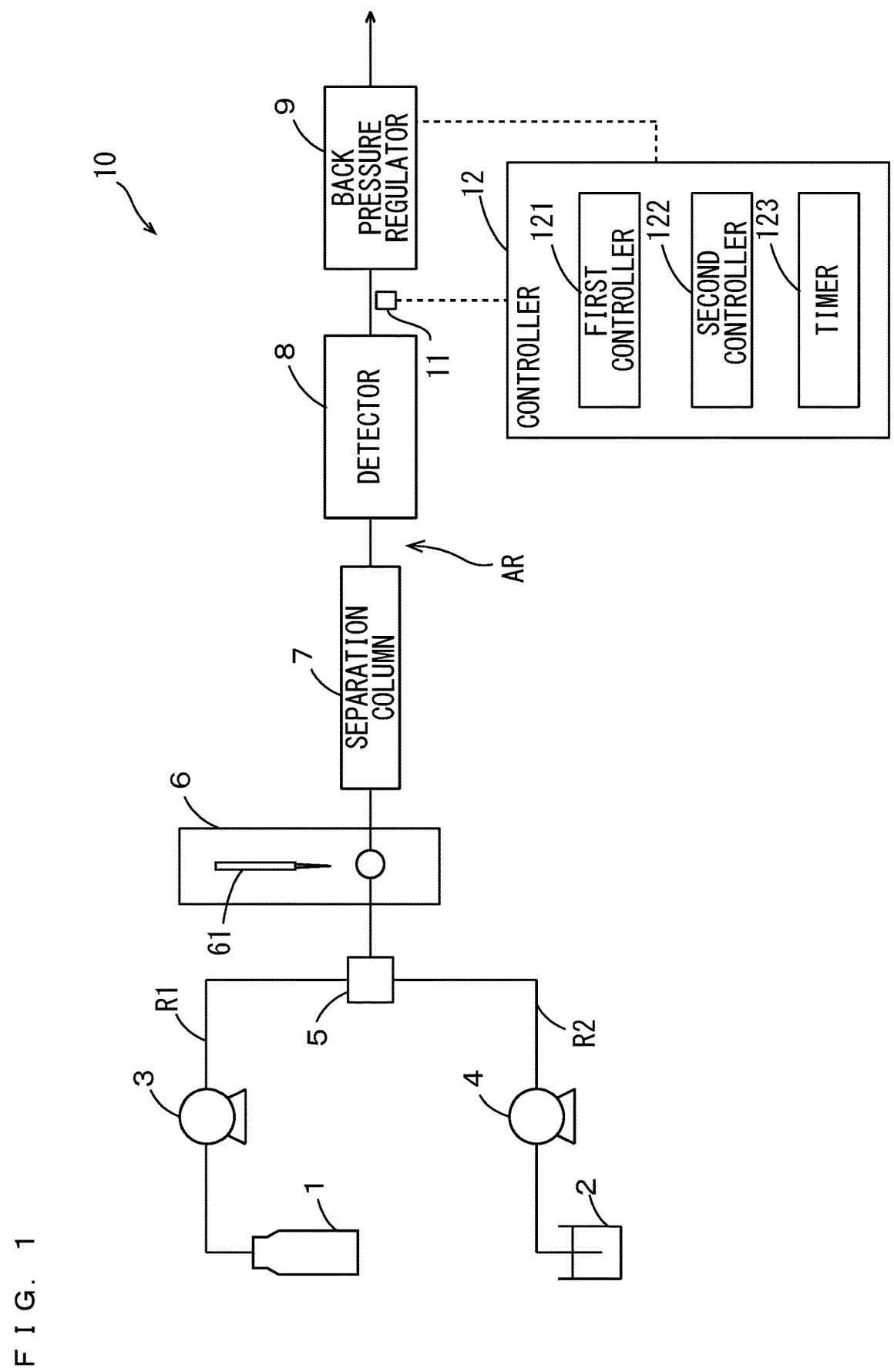
FIG. 1 is an overview of a supercritical fluid chromatograph according to the present embodiment.

FIG. 1 is an overview of the configuration of the supercritical fluid chromatograph 10 according to the present embodiment. The supercritical fluid chromatograph 10 includes a carbon dioxide bottle 1, a modifier tank 2, a first pump 3, a second pump 4, a mixer 5, an autosampler 6, a separation column 7, a detector 8, and a Back Pressure Regulator (BPR) 9.

Liquid carbon dioxide is stored in the carbon dioxide bottle 1. The first pump 3 is driven, so that the liquid carbon dioxide in the carbon dioxide bottle 1 is sent to a carbon dioxide flow path R1. An organic solvent, as a modifier, is stored in the modifier tank 2. The second pump 4 is driven, so that the modifier in the modifier tank 2 is sent to a modifier flow path R2. In the present embodiment, methanol is used as a modifier.

The liquid carbon dioxide sent through the carbon dioxide flow path R1 and the methanol sent through the modifier flow path R2 are mixed by the mixer 5. In this manner, liquid carbon dioxide and methanol are used as mobile phases in the supercritical fluid chromatograph 10 according to the present embodiment. A supercritical state of carbon dioxide is acquired at a relatively low temperature and a relatively low pressure. A modifier is used to enhance the solubility of a sample to be measured. As a modifier, another organic solvent such as ethanol may be used.

Liquid carbon dioxide and methanol mixed by the mixer 5 are supplied to an analysis flow path AR as a mobile phase. During an analysis process, the pressure in the analysis flow path AR is adjusted to a value equal to or larger than 10 MPa by the back pressure regulator 9 provided at a position farther downstream than the detector 8. Further, the temperature of the analysis flow path AR is adjusted to an appropriate temperature (a value equal to or larger than 31.1 degrees) so as to put carbon dioxide in a supercritical fluid state. Thus, a mobile phase supplied to the analysis flow path AR is in a supercritical fluid state.

The mobile phase supplied to the analysis flow path AR is sent to the autosampler 6. In the autosampler 6, a sample is dropped into the analysis flow path AR by an injector 61. The mobile phase, which is a supercritical fluid, into which the sample is dropped in the autosampler 6 is sent to the separation column 7.

The mobile phase into which the sample has been injected is supplied to the separation column 7. In the separation column 7, the sample is separated in a period during which the mobile phase passes through a stationary phase in the separation column 7. The mobile phase in which the sample is dissolved and which has flowed out from the separation column 7 is sent to the detector 8.

The mobile phase in which the sample is dissolved in the separation column 7 is supplied to the detector 8. The sample is detected by the detector 8. As the detector 8, an ultraviolet detector, a visible light detector or a fluorescence detector is used, for example.

Further, as shown in FIG. 1, the supercritical fluid chromatograph 10 includes a pressure sensor 11 and a controller 12. The pressure sensor 11 is provided in the analysis flow path AR through which the mobile phase, which is a supercritical fluid, flows. The pressure sensor 11 is provided in the analysis flow path AR that extends from the detector 8 to the back pressure regulator 9. The controller 12 detects the pressure of the mobile phase, which is a supercritical fluid, that has been detected by the pressure sensor 11. The controller 12 inputs a detection value of the pressure sensor 11. The controller 12 controls the back pressure regulator 9 based on the detection value of the pressure sensor 11, etc.

(2) Configuration of Controller

The controller 12 includes a first controller 121 and a second controller 122. The first controller 121 controls the pressure of a mobile phase in the analysis flow path AR during a period in which the supercritical fluid chromatograph 10 executes an analysis process. The first controller 121 increases the pressure in the analysis flow path AR, puts a mobile phase in a supercritical fluid state and maintains an environment for execution of the analysis process by controlling the back pressure regulator 19. The first controller 121 maintains the pressure in the analysis flow path AR at a value equal to or larger than 10 MPa by controlling the back pressure regulator 9. The first controller 121 controls the back pressure regulator 9 based on a detection value of the pressure sensor 11.

The second controller 122 performs depressurization control on the analysis flow path AR after the supercritical fluid chromatograph 10 ends an analysis process. The second controller 122 decreases the pressure in the analysis flow path AR to about an atmospheric pressure by controlling the back pressure regulator 9. The second controller 122 controls the back pressure regulator 9 based on a detection value of the pressure sensor 11.

Figure 2:
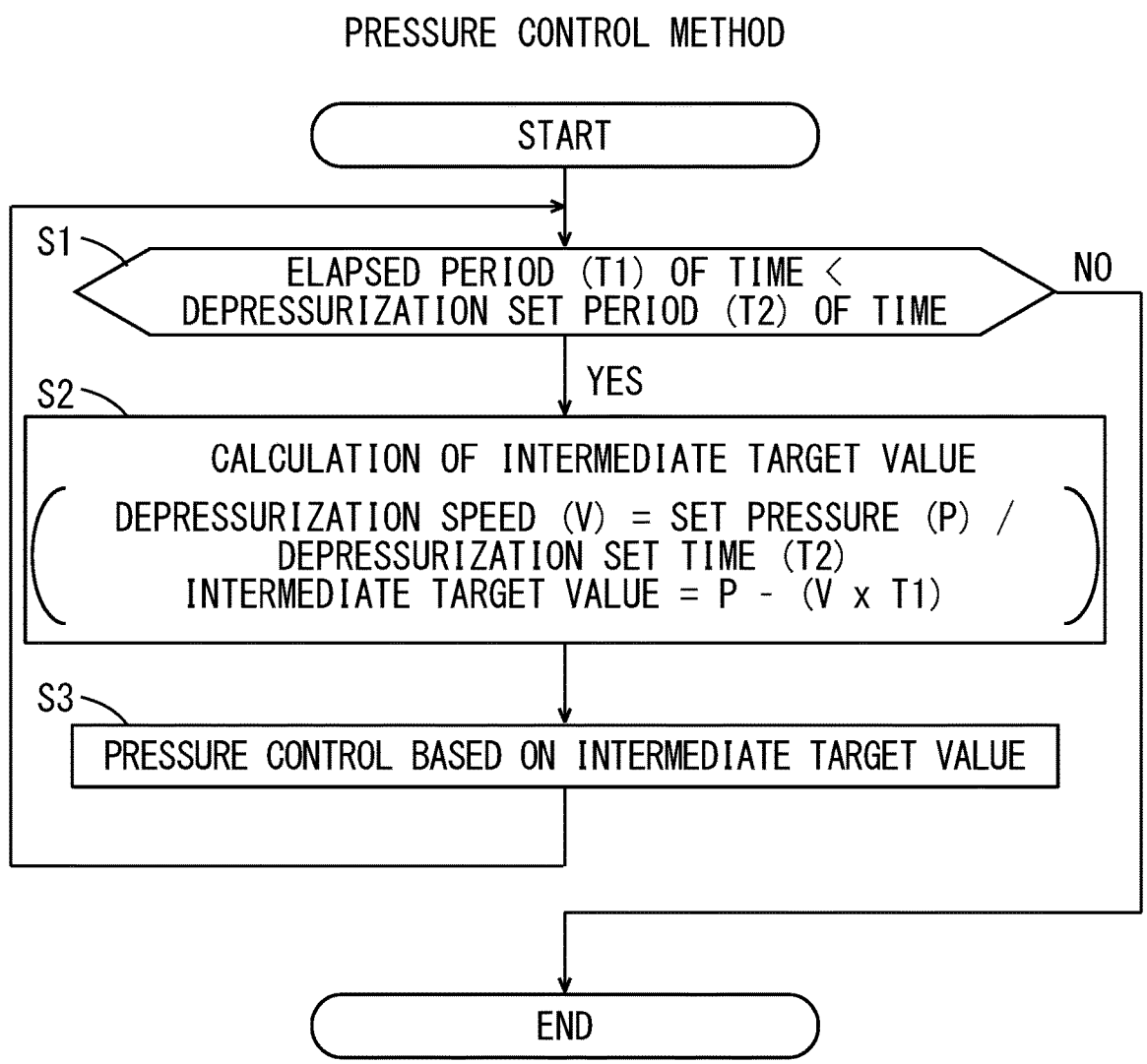
FIG. 2 is a flowchart showing a pressure control method according to the present embodiment.

FIG. 2 is a flowchart showing a pressure control method performed by the second controller 122. The second controller 122 performs the pressure control method shown in FIG. 2 after the supercritical fluid chromatograph 10 ends the analysis process. The pressure control method shown in FIG. 2 is a method of executing a depressurization process on the analysis flow path AR. For example, the second controller 122 performs the pressure control method shown in FIG. 2 in response to an instruction for ending an analysis process provided by an operator or an instruction for depressurization provided by an operator.

The second controller 122 acquires a current pressure in the analysis flow path AR from the pressure sensor 11 when starting to perform the pressure control method shown in FIG. 2. That is, the second controller 122 acquires a pressure in the analysis flow path AR in an environment for execution of the analysis process. For example, the second controller 122 acquires a detection value of 10 MPa from the pressure sensor 11 as a current pressure in the analysis flow path AR.

The second controller 122 resets a timer 123 to 0 when starting to perform the pressure control method shown in FIG. 2, and starts measurement of an elapsed period (T1) of time while the pressure control method is performed. In the step S1, the second controller 122 acquires a current elapsed period (T1) of time from the timer 123. In the step S1, the second controller 122 determines whether the current elapsed period (T1) of time exceeds a set depressurization period (T2) of time.

Here, the set depressurization period (T2) of time is a period of time required for the pressure in the analysis flow path AR to decrease from the pressure in the environment for execution of an analysis process to about the atmospheric pressure. That is, the set depressurization period (T2) of time is a period of time required for the pressure in the analysis flow path AR, which puts a solvent in a supercritical fluid state, to decrease to about the atmospheric pressure. For example, the set depressurization period T2 of time is a period of time required for the pressure in the analysis flow path AR to decrease from 10 MPa which is the pressure during execution of an analysis process to 0.1 MPa which is about the atmospheric pressure. Here, as one example, the pressure in the analysis flow path AR in the environment for execution of an analysis process is 10 MPa, and 200 seconds is set as the set depressurization period (T2) of time.

In a case where the elapsed period (T1) of time does not exceed the set depressurization period (T2) of time, the second controller 122 performs the step S2. In the step S2, the second controller 122 calculates an intermediate target value. An intermediate target value is a target value for the pressure in the analysis flow path AR. The second controller 122 does not set the atmospheric pressure, which is a final target value, as the target value for the pressure in the analysis flow path AR, but sets an intermediate target value which is higher than the final target value.

The second controller 122 first calculates a depressurization speed (V) in order to calculate an intermediate target value. A depressurization speed (V) is found by the following formula 1.

$$\text{A depressurization speed }(V)=\text{a set pressure }(P)/\text{a set depressurization period }(T2)\text{ of time} \qquad \text{(Formula 1)}$$

A set pressure (P) is a pressure to be set in the environment for execution of an analysis process. Here, as described above, the set pressure (P) is 10 MPa, and the set depressurization period (T2) of time is 200 seconds.

Therefore, a depressurization speed is represented by the following formula.

A depressurization speed ($V$)=10 (MPa)/200 (seconds)=0.05 (MPa/second).

Next, the second controller 122 calculates an intermediate target value using the following formula 2.

An intermediate target value=a set pressure ($P$)−(a depressurization speed ($V$)×an elapsed period ($T1$) of time) (Formula 2)

In a case where an elapsed period (T1) of time is 10 seconds, an intermediate target value is obtained by the following formula.

An intermediate target value after 10 seconds has elapsed=10 (MPa)−(0.05 (MPa/second)×10 seconds)=9.5 MPa That is, at a point in time at which the elapsed period (T1) of time since the start of depressurization procedure becomes 10 seconds, an intermediate target value is set to 9.5 MPa.

When an intermediate target value is calculated, the second controller 122 performs the pressure control next based on the intermediate target value in the step S3. The second controller 122 acquires a current pressure in the analysis flow path AR from the pressure sensor 11 and performs feedback control based on a difference between the intermediate target value and the acquired pressure. For example, a stepping motor and a piezo element are used as actuators for driving a valve element of the back pressure regulator 9. When the feedback control is performed by the second controller 122 in order to get the pressure to reach an intermediate target value, the stepping motor or the piezo element included in the back pressure regulator 9 is controlled. For example, the valve element is driven by the stepping motor in a case where a control amount is large, and the valve element is driven by the piezo element in a case where a control amount is small.

The second controller 122 performs the control pressure based on an intermediate target value in the step S3 and then returns to the step S1. Then, the second controller 122 acquires an elapsed period (T1) of time from the timer 123. In a case where an elapsed period (T1) of time does not exceed a set depressurization period (T2) of time, the second controller 122 performs the step S2 again and calculates a new intermediate target value. Then, the second controller 122 performs the pressure control based on the new intermediate target value in the step S3. In this manner, the second controller 122 calculates a new intermediate target value in accordance with an elapsed period (T1) of time and performs the pressure control based on the new intermediate target value. Because an intermediate target value is calculated by the above-mentioned formula 2, the intermediate target value as well as an elapsed period (T1) time are small values.

The second controller 122 repeatedly executes the process of the steps S1 to S3 and gradually decreases the pressure in the analysis flow path AR. Then, when an elapsed period (T1) of time exceeds a set depressurization period (T2) of time in the step S1, the second controller 122 ends performing the pressure control method shown in FIG. 2.

In this manner, the supercritical fluid chromatograph 10 of the present embodiment includes the second controller 122 that sets an intermediate target value for a pressure in the analysis flow path AR and controls the pressure in the analysis flow path AR in order to get the pressure in the analysis flow path AR to reach the intermediate target value, when ending the environment for execution of an analysis process. Thus, the supercritical fluid chromatograph 10 of the present embodiment can moderately decrease the pressure in the analysis flow path AR as compared to the control for setting a final target value for a pressure in the analysis flow path AR, when ending the environment for execution of an analysis process.

In the supercritical fluid chromatograph 10 of the present embodiment, a rapid change in pressure in the analysis flow path AR can be suppressed when the environment for execution of an analysis process ends. Thus, a loss of uniformity of a stationary phase in the separation column 7 can be suppressed. Thus, separation performance in the separation column 7 can be prevented from being degraded. Further, the separation column 7 can be prevented from being deteriorated, and the lifetime of the separation column 7 can be prevented from being shortened.

In the supercritical fluid chromatograph 10 of the present embodiment, the second controller 122 controls a pressure in the analysis flow path AR in order to get the pressure in the analysis flow path AR to reach an intermediate target value, and then sets a new intermediate target value lower than the intermediate target value and controls the pressure in the analysis flow path AR in order to get the pressure in the analysis flow path AR to reach the new intermediate target value. Thus, the pressure in the analysis flow path AR can decrease gradually.

In the above-mentioned embodiment, an intermediate target value for a pressure is calculated with use of the formula 1 and the formula 2. Thus, a pressure decreasing speed can be adjusted in accordance with a set depressurization period (T2) of time. It is possible to suppress a change in pressure in the analysis flow path AR and prevents deterioration of the separation column 7 by adjusting a set depressurization period (T2) of time.

While a depressurization period (T2) of time is set to 200 seconds after an analysis process executed by the supercritical fluid chromatograph 10 ends in the above-mentioned embodiment, this is merely one example. An optimal set depressurization period (T2) of time may be determined suitably in accordance with the configuration of the supercritical fluid chromatograph 10 or the configuration of the separation column 7. For example, a set depressurization period (T2) of time is preferably set such that a period of time required for a set pressure (p) to decrease by half is at least 10 seconds or more. It is possible to suppress a rapid change in pressure in the analysis flow path AR by setting a set depressurization period (T2) of time such that a period of time required for a set pressure (P) to decrease by half is 10 seconds or more. More preferably, a period of time required for a set pressure (P) to decrease by half is 1 minute or more. It is possible to more effectively suppress a rapid change in pressure in the analysis flow path AR by setting a set depressurization period (T2) of time such that a period of time required for a set pressure (P) to decrease by half is 1 minute or more. Because 200 seconds is set as a set depressurization period (T2) of time in the above-mentioned embodiment, a period of time required for a set pressure (P) to decrease by half is about 100 seconds.

(3) Result of Experiment

Figure 3:
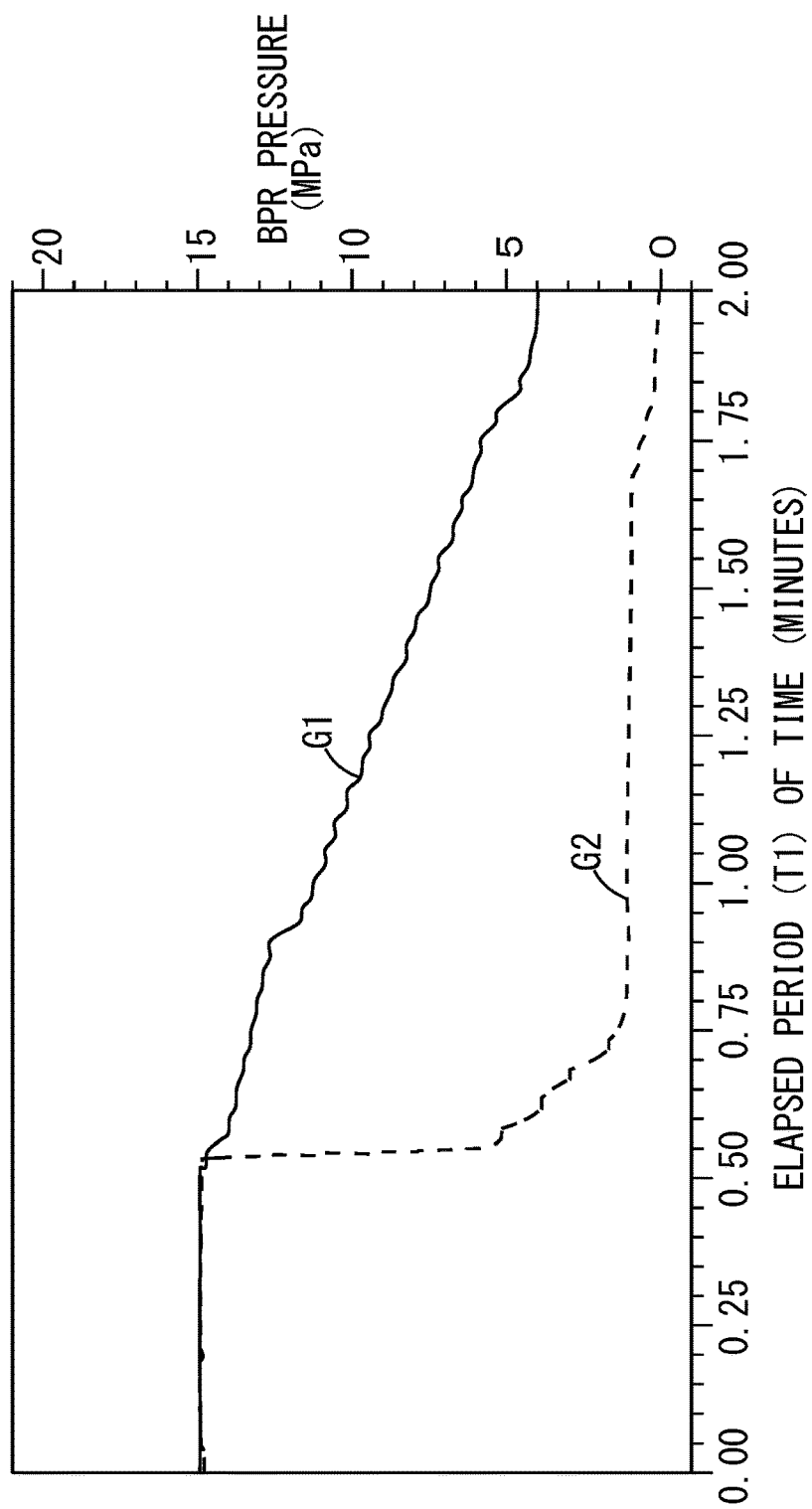
FIG. 3 is a diagram showing a result of experiment using the pressure control method according to the present embodiment.

FIG. 3 is a graph showing a result of experiment in a case where the pressure control method of the present embodiment is performed. In FIG. 3, the abscissa indicates an elapsed period T1 of time (minutes), and the ordinate indicates a pressure (MPa) at a position farther upstream than the back pressure regulator 9. In FIG. 3, the graph G1 indicated by the solid line is a graph representing detection values of the pressure sensor 11 in a case where the pressure control method of the present embodiment is performed. That is, the graph G1 is a graph representing a change in pressure at a position farther upstream than the back pressure regulator 9 in a case where the pressure control method according to the present embodiment is performed. In FIG. 3, the graph G2 indicated by the dotted line is a graph representing detection values of the pressure sensor 11 in a case where the pressure control method of the present embodiment is not performed. That is, the graph 2 is a graph representing a change in pressure in a case where the valve element of the back pressure regulator 9 is fully opened and the pressure in the analysis flow path AR is decreased abruptly when an analysis process ends.

As shown in the graph G1 of FIG. 3, in a case where the pressure control method of the present embodiment is performed, the second controller 122 controls the pressure in order to get the pressure to reach an intermediate target value. Therefore, a change in pressure is moderate. In contrast, in a case where the pressure control method of the present embodiment is not performed, the pressure at a position farther upstream than the back pressure regulator 9 decreases rapidly. In this manner, in a case where the pressure control method of the present embodiment is performed, a pressure decreasing rate at which a pressure decreases to reach an intermediate target value is lower than a pressure decreasing rate at which a pressure decreases without setting of an intermediate target value. Thus, as compared to a case where the back pressure regulator 9 is fully opened, a change in pressure in the flow path can be suppressed.

(4) Correspondences Between Constituent Elements in Claims and Parts in Preferred Embodiments In the following paragraphs, non-limiting examples of correspondences between various elements recited in the claims below and those described above with respect to various preferred embodiments of the present disclosure are explained. In the above-mentioned embodiment, the supercritical fluid chromatograph 10 is an example of a supercritical fluid apparatus. Further, the carbon dioxide bottle 1, the modifier tank 2, the first pump 3, the second pump 4, the carbon dioxide flow path R1 and the modifier flow path R2 are examples of a solvent supplier. Further, in the above-mentioned embodiment, the back pressure regulator 9 is an example of a pressure control device, the analysis flow path AR is an example of a flow path, and the analysis process executed by the supercritical fluid chromatograph 10 is an example of a predetermined process.

As each of constituent elements recited in the claims, various other elements having configurations or functions described in the claims can be also used.

(5) Other Embodiments

As described above, in the present embodiment, the supercritical fluid chromatograph 10 is described as a device that uses a supercritical fluid, by way of example. The present invention can be applied to a device that performs a method of extracting a sample using a supercritical fluid (SFE) as another supercritical fluid apparatus. Also in a case where the present invention is applied to the device that performs SFE, a rapid change in pressure in a flow path is suppressed. With SFE, an unnecessary component may be extracted from an extraction container, and a residue in the extraction container may be collected as a target sample. In case of such an extraction process, a sample in the extraction container is disturbed due to a rapid change in pressure in a flow path. It is possible to suppress a disturbance on a sample in an extraction container due to a change in pressure by performing the pressure control method of the present embodiment. A sample in a container extracted by SFE is kept in a good condition.

While preferred embodiments of the present disclosure have been described above, it is to be understood that variations and modifications will be apparent to those skilled in the art without departing the scope and spirit of the present disclosure. The scope of the present disclosure, therefore, is to be determined solely by the following claims.

(6) Aspects

It is understood by those skilled in the art that the plurality of above-mentioned illustrative embodiments are specific examples of the below-mentioned aspects.

(Item 1) A supercritical fluid apparatus according to one aspect may include a solvent supplier that supplies a solvent, a pressure control device provided in a flow path for a solvent supplied by the solvent supplier, and a controller that controls the pressure control device, wherein the controller may include a first controller that increases a pressure in the flow path, puts the solvent in a supercritical fluid state and maintains an environment for execution of a predetermined process by controlling the pressure control device, and a second controller that sets an intermediate target value for a pressure in the flow path and controls a pressure in the flow path in order to get the pressure to reach the intermediate target value, when ending the environment for execution of a predetermined process.

A rapid change in pressure in the flow path in the supercritical fluid apparatus can be suppressed.

(Item 2) The supercritical fluid apparatus according to item 1, wherein the second controller may control a pressure in the flow path in order to get the pressure to reach the intermediate target value, and then may set a new intermediate target value lower than the intermediate target value and control a pressure in the flow path in order to get the pressure to reach the new intermediate target value.

A pressure in the flow path can be decreased gradually.

(Item 3) The supercritical fluid apparatus according to item 1, wherein letting a pressure in the flow path in the environment for execution of a predetermined process be a set pressure (P), letting a period of time that has elapsed since depressurization on the flow path is started be an elapsed period (T1) of time, and letting a set period of time required for depressurization on the flow path to be completed be a set depressurization period (T2) of time, the intermediate target value may be calculated by a depressurization speed (V)=a set pressure (P)/a set depressurization period (T2) of time, and an intermediate target value=a set pressure (P)−(a depressurization speed (V)×an elapsed period (T1) of time).

A pressure decreasing speed can be adjusted in accordance with a set depressurization period of time. It is possible to suppress a change in pressure in the flow path by adjusting a set depressurization period of time.

(Item 4) The supercritical fluid apparatus according to item 1, wherein a pressure decreasing rate at which a pressure decreases in order to reach the intermediate target value may be lower than a pressure decreasing rate in a case where a pressure decreases without setting of the intermediate target value.

(Item 5) The supercritical fluid apparatus according to item 1, wherein the intermediate target value may be set such that a period of at least 10 seconds or more elapses as a period of time required for a pressure in the flow path in the environment for execution of a predetermined process to decrease by half.

A rapid change in pressure in the flow path can be suppressed.

(Item 6) The supercritical fluid apparatus according to item 1, wherein the intermediate target value may be set such that at least a period of 1 minute or more elapses as a period of time required for a pressure in the flow path in the environment for execution of a predetermined process to decrease by half.

A rapid change in pressure in the flow path can be suppressed more effectively.

(Item 7) The supercritical fluid apparatus according to item 1, wherein the supercritical fluid apparatus may include a supercritical fluid chromatograph.

A change in pressure in an analysis flow path can be suppressed. This prevents deterioration of a separation column.

(Item 8) The supercritical fluid apparatus according to item 1, wherein the supercritical fluid apparatus includes a device that performs supercritical fluid extraction.

A change in pressure in a flow path can be suppressed. This prevents a disturbance on a sample in an extraction container.

(Item 9) A pressure control method used in a supercritical fluid apparatus, according to another aspect may include the processes of increasing a pressure in a flow path, putting a solvent in a supercritical fluid state and maintaining an environment for execution of a predetermined process by controlling a pressure control device provided in the flow path for the solvent supplied by a solvent supplier, and setting an intermediate target value for a pressure in the flow path and controlling a pressure in the flow path in order to get the pressure to reach the intermediate target value, when ending the environment for execution of a predetermined process.

The invention claimed is:
1. A supercritical fluid apparatus comprising:
a solvent supplier that supplies a solvent;
a column provided in a flow path for a solvent supplied by the solvent supplier;
a pressure control device provided further downstream than the column in the flow path;
a controller that controls the pressure control device; and
a pressure sensor that detects a pressure in the flow path, wherein
the controller includes
a first controller configured to increase the pressure in the flow path including the column, put the solvent in a supercritical fluid state and maintain an environment for execution of a predetermined process by controlling the pressure control device, and
a second controller configured to set an intermediate target value for the pressure in the flow path including the column and feedback-control the pressure control device based on a difference between the intermediate target value and a pressure value obtained by the pressure sensor to lower the pressure in the flow path toward the intermediate target value to protect the column, when ending the environment for execution of a predetermined process.

2. The supercritical fluid apparatus according to claim 1, wherein
the second controller is configured to control the pressure in the flow path in order to get the pressure to reach the intermediate target value, and then set a new intermediate target value lower than the intermediate target value and control the pressure in the flow path in order to get the pressure to reach the new intermediate target value.

3. The supercritical fluid apparatus according to claim 1, wherein
letting the pressure in the flow path in the environment for execution of a predetermined process be a set pressure (P), letting a period of time that has elapsed since depressurization on the flow path is started be an elapsed period (T1) of time, and letting a set period of time required for depressurization on the flow path to be completed be a set depressurization period (T2) of time, the second controller is configured to calculate the intermediate target value by a depressurization speed ($V$)=a set pressure ($P$)/a set depressurization period ($T2$) of time, and an intermediate target value=a set pressure ($P$)−(a depressurization speed ($V$)×an elapsed period ($T1$) of time).

4. The supercritical fluid apparatus according to claim 1, wherein
the second controller is configured to control a pressure decreasing rate at which a pressure decreases in order to reach the intermediate target value to be lower than a pressure decreasing rate in a case where a pressure decreases without setting of the intermediate target value.

5. The supercritical fluid apparatus according to claim 1, wherein
the second controller is configured to set the intermediate target value such that a period of at least 10 seconds or more elapses as a period of time required for the pressure in the flow path in the environment for execution of a predetermined process to decrease by half.

6. The supercritical fluid apparatus according to claim 1, wherein
the second controller is configured to set the intermediate target value such that at least a period of 1 minute or more elapses as a period of time required for the pressure in the flow path in the environment for execution of a predetermined process to decrease by half.

7. The supercritical fluid apparatus according to claim 1, wherein
the supercritical fluid apparatus includes a supercritical fluid chromatograph.

8. The supercritical fluid apparatus according to claim 1, wherein
the supercritical fluid apparatus includes a device that performs supercritical fluid extraction.

9. The supercritical fluid apparatus according to claim 1, wherein the second controller is configured to control the pressure in the flow path in order to cause the pressure to reach the intermediate target value in order to avoid degrading a uniformity of a stationary phase in the column.

10. A pressure control method used in a supercritical fluid apparatus including a column provided in a flow path for a solvent supplied by a solvent supplier, including the processes of:

increasing a pressure in the flow path, putting the solvent in a supercritical fluid state and maintaining an environment for execution of a predetermined process by controlling a pressure control device provided further downstream than the column in the flow path; and setting an intermediate target value for the pressure in the flow path including the column and controlling the pressure in the flow path using feedback-control of the pressure control device based on a difference between the intermediate target value and a pressure value obtained by a pressure sensor to lower the pressure in the flow path toward the intermediate target value to protect the column, when ending the environment for execution of a predetermined process.

\* \* \* \* \*